United States Patent
Hess, Jr. et al.

(10) Patent No.: US 7,021,588 B2
(45) Date of Patent: Apr. 4, 2006

(54) SYSTEM AND METHOD FOR MANAGING TWO OR MORE LOCOMOTIVES OF A CONSIST

(75) Inventors: Gerald James Hess, Jr., Erie, PA (US); Jan Alan Nagle, North East, PA (US); Shuo Chen, Erie, PA (US); Randall Slomski, Erie, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 10/429,596

(22) Filed: May 5, 2003

(65) Prior Publication Data

US 2003/0213875 A1    Nov. 20, 2003

Related U.S. Application Data

(63) Continuation-in-part of application No. 10/177,547, filed on Jun. 21, 2002, now Pat. No. 6,691,957.

(60) Provisional application No. 60/299,932, filed on Jun. 21, 2001.

(51) Int. Cl.
*B61C 5/00* (2006.01)

(52) U.S. Cl. .................... 246/186; 246/187 R; 701/19; 701/20

(58) Field of Classification Search .................. 701/19, 701/20; 246/187 C, 182 R, 187 R, 182 B, 246/182 C, 186, 167 R; 105/61; 318/370
See application file for complete search history.

(56) References Cited

U.S. PATENT DOCUMENTS

| | | | |
|---|---|---|---|
| 4,234,922 A | | 11/1980 | Wilde et al. |
| 4,253,399 A | | 3/1981 | Spigarelli |
| 4,266,485 A | | 5/1981 | Bruner et al. |
| 4,344,138 A | | 8/1982 | Frasier |
| 4,344,364 A | * | 8/1982 | Nickles et al. ............. 105/62.1 |
| 4,401,035 A | * | 8/1983 | Spigarelli et al. ............. 105/61 |
| 4,582,280 A | | 4/1986 | Nichols et al. |
| 4,602,335 A | * | 7/1986 | Perlmutter .................. 701/20 |
| 4,735,385 A | * | 4/1988 | Nickles et al. .......... 246/182 B |
| 5,500,799 A | | 3/1996 | Balukin et al. |
| 5,517,923 A | | 5/1996 | Cathiard |
| 5,530,328 A | | 6/1996 | Fernandez et al. |
| 5,581,472 A | | 12/1996 | Miller et al. |
| 5,787,371 A | | 7/1998 | Balukin et al. |
| 5,950,967 A | | 9/1999 | Montgomery |
| 5,969,643 A | * | 10/1999 | Curtis ........................ 340/988 |
| 6,144,901 A | * | 11/2000 | Nickles et al. ................. 701/19 |
| 6,263,266 B1 | * | 7/2001 | Hawthorne .................. 701/19 |
| 6,434,452 B1 | | 8/2002 | Gray |

* cited by examiner

*Primary Examiner*—Mark T. Le
(74) *Attorney, Agent, or Firm*—Senniger Powers; Scott Andes

(57) ABSTRACT

The system and method for controlling a consist of at least first and second locomotives having discrete operating modes. The method comprises receiving a control command and determining a power operating mode of the first locomotive and a power operating mode of the second locomotive as a function of the control command and an optimization parameter. The power operating mode of the second locomotive is different as compared to the power operating mode of the first locomotive in at least one mode of operation of the method. The method further comprises controlling the first locomotive responsive to the power operating mode of the first locomotive and controlling the second locomotive responsive to the power operating mode of second locomotive.

31 Claims, 4 Drawing Sheets

SYSTEM AND METHOD FOR MANAGING TWO OR MORE LOCOMOTIVES OF A CONSIST

CROSS REFERENCE TO RELATED APPLICATIONS

The invention of the present application is a continuation-in-part of U.S. patent application Ser. No. 10/177,547, filed on Jun. 21, 2002, now U.S. Pat. No. 6,691,957, entitled Control and Method for Optimizing the Operation of Two or More Locomotives of a Consist, which claims priority based on U.S. Provisional Application Ser. No. 60/299,932, filed on Jun. 21, 2001.

FIELD OF THE INVENTION

This invention generally relates to an automatic consist management system and, in particular, a system and method for independently controlling each locomotive of a consist in order to optimize one or more operations of the locomotives.

BACKGROUND OF THE INVENTION

In a current locomotive consist, the locomotive controls are linked together and are controlled in response to operator input provided to the master or lead locomotive. In general, locomotives operate in a discrete number of power modes, usually eight. These power modes are referred to as "notches" and the notch at which a particular lead locomotive is set will determine the speed of operation of the consist. In the current locomotive consist, an operator can only command all locomotives in the consist to run in the same notch. For example, in a three unit consist, when the operator moves the throttle to notch 6 in the lead unit, the same notch 6 command will be sent to the locomotive controllers of the other two units of the consist. This command is sent through a communication link, one example being a train line which is a 16 wire harness interconnecting the locomotives of the consist. Alternatively, a railroad wireless communication system such as disclosed, for example, in U.S. Pat. No. 4,582,280, incorporated herein by reference in its entirety, may be used to communicate between the lead unit and the remote units of a consist.

Although this system and method of operation of the consist provides simplicity, there is a need for a system which independently operates each of the locomotives so that the performance of the consist can be optimized.

BRIEF SUMMARY OF THE INVENTION

In one aspect of the invention, a system and method for controlling a consist of at least first and second locomotives having discrete operating modes. The system and method comprises receiving a control command and determining a power operating mode of the first locomotive and a power operating mode of the second locomotive as a function of the control command and an optimization parameter. The power operating mode of the second locomotive is different as compared to the power operating mode of the first locomotive in at least one mode of operation of the method. The method further comprises controlling the first locomotive responsive to the power operating mode of the first locomotive and controlling the second locomotive responsive to the power operating mode of second locomotive.

In another aspect of the invention, a method for controlling a consist of at least first and second locomotives having discrete operating modes. The method comprises receiving a control command from an operator and controlling an operation of the first locomotive responsive to the power operating mode of the first locomotive, said power operating mode of the first locomotive being indicative of the control command. The method also comprises determining a power operating mode of the second locomotive as a function of the control command. The power operating mode of the second locomotive is different as compared to the power operating mode of the first locomotive in at least one mode of operation of the method. The method further comprises communicating the power operating mode of the second locomotive over a communication link to the second locomotive and controlling an operation of the second locomotive responsive to the power operating mode of the second locomotive.

The system and method of the invention has a number of advantages over the prior art. Each locomotive of the consist can be independently controlled thereby permitting the operating parameters of the consist to be optimized. The independent control of each of the locomotives also provides flexibility. The simplicity and ease of use of the system and method of the invention is transparent to the operator so that the operator does not have to do anything differently than what the operator presently does under the prior art consist control. The system and method of the invention can also be retrofitted to existing consists. The system and method of the invention allow optimization of the operation of the consist to increase fuel efficiency, to optimize power output and to optimize the performance of each locomotive as well as the consist as a whole.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
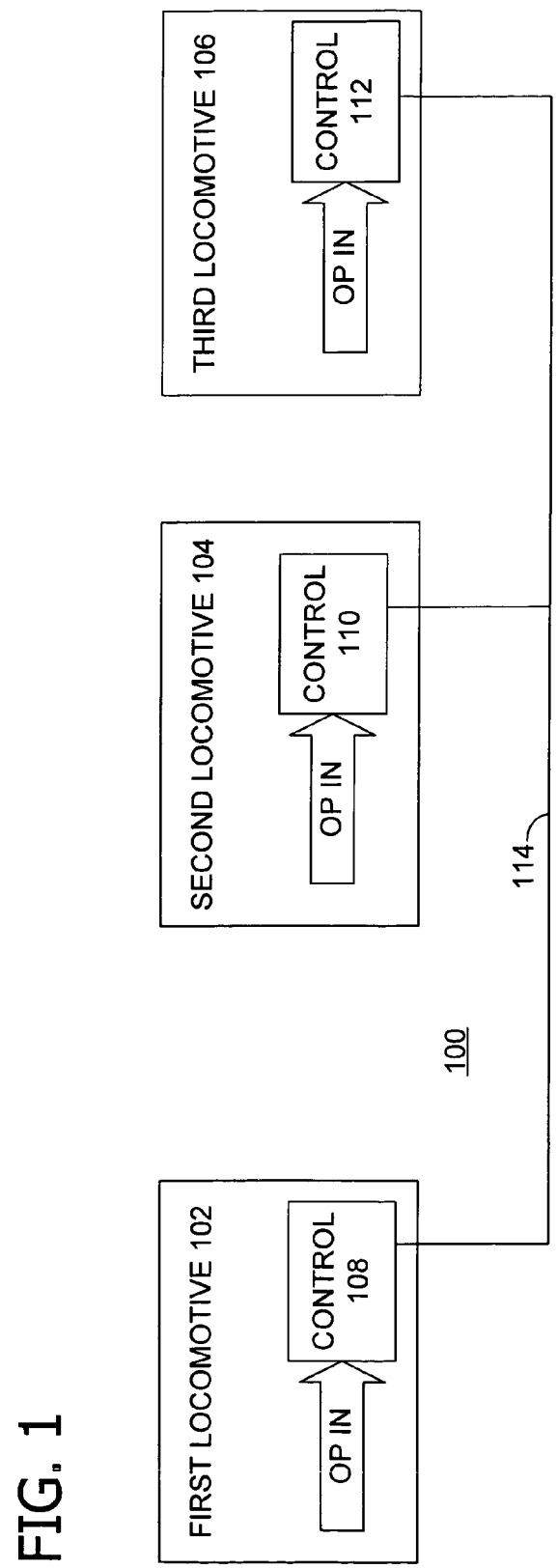
FIG. 1 is a block diagram of a system and method according to the invention for controlling the operation of three-locomotives of a consist.

Referring to FIG. 1, a system 100 for controlling a consist of three locomotives 102, 104, and 106 is illustrated in block diagram form. Although the system is illustrated in a context of a three-locomotive consist, it is understood that the system and method of the invention may be also implemented in a two-locomotive consist or in the consist of more than three units such as a four or more locomotive consist. The first locomotive 102 has a first locomotive control 108 that controls the operation of the locomotive. Similarly, the second locomotive 104 has a second locomotive control 110 and the third locomotive 106 has a third locomotive control 112. As shown in FIG. 1, the locomotive controls are interconnected by a communication link 114. It is contemplated that this link may be any wired or wireless link between the locomotive controls such as the MU cable which presently provides a hard wire communication link among the locomotives of a consist. For example, if the locomotive controls include microprocessors, the communication link 114 may be a network bus such as an Ethernet twisted pair cable linking the microprocessors. Alternatively, each of the locomotive controls 108, 110, and 112 may be associated with a transceiver that transmits and receives signals in communication with each other (see U.S. Pat. No. 4,582,280 noted above). The locomotive controls 108, 110, and 112 constitute an operator control for use by the operator to indicate a desired operating condition.

In its simplest form, the desired operating condition may be a notch setting at which the consist should equivalently operate. Generally, one of the units would be designated a lead unit in which the operator would ride. The operator would provide input to the control of the lead unit that would communicate corresponding input information to the other controls. FIG. 1 illustrates operator input to all three units to indicate that the operator may be riding in any one of the units and would provide the operator input via the control of the unit in which the operator is riding.

In more sophisticated systems, the operator input may include a total horsepower requirement, a fuel efficiency level, a power output requirement or a performance requirement of each of the locomotives or of the consist as a whole. In this latter, more sophisticated embodiment, the controls 108, 110 and 112 would calculate by algorithm or determine through a look-up table the level of operation of each of the locomotives. The optimization of the operation of the consist will be discussed in greater detail below. In general, the operator control may be any input device which can provide information to the linked controls of the consist. For example, the operator control may be a keyboard, a keypad, a joystick or simply a multi-position switch that would indicate a notch position. In an alternative, the operator control may be a remote control from a remote control system or remotely located operator.

The first locomotive control 108 responds to the desired operating mode as indicated by the operator input and controls an operating mode of the first locomotive 102. Similarly, the second locomotive control 110 responds to the desired operating mode as indicated by the operator input for controlling the operating mode of the second locomotive 104. Similarly, the third locomotive control 112 responds to the desired operating mode as indicated by the operator input for controlling an operating mode of the third locomotive 106. As shown in FIG. 1, the operator input (OP IN) may be any input that is provided to any of the controls 108, 110 or 112.

One feature of the invention is the independent setting of the controls of each of the locomotive units of the consist. As a result, in at least one mode of operation of the consist as a whole, the operating mode of the first locomotive 102 is different as compared to the operating condition of the other locomotives 104,106. For example, locomotive 102 may be operating at notch 6 whereas locomotive 104 may be operating at notch 5. In addition, the operating mode of the third locomotive is independent of the other locomotives and may be different than either or both of the locomotives. In the previously noted example, locomotive 3 may operate at notch 5, 6, or 7. The coordination of the operation of the locomotives is accomplished by the communication link 114 that interconnects the controllers and provides information corresponding to the desired operating mode to the controllers.

Figure 2:
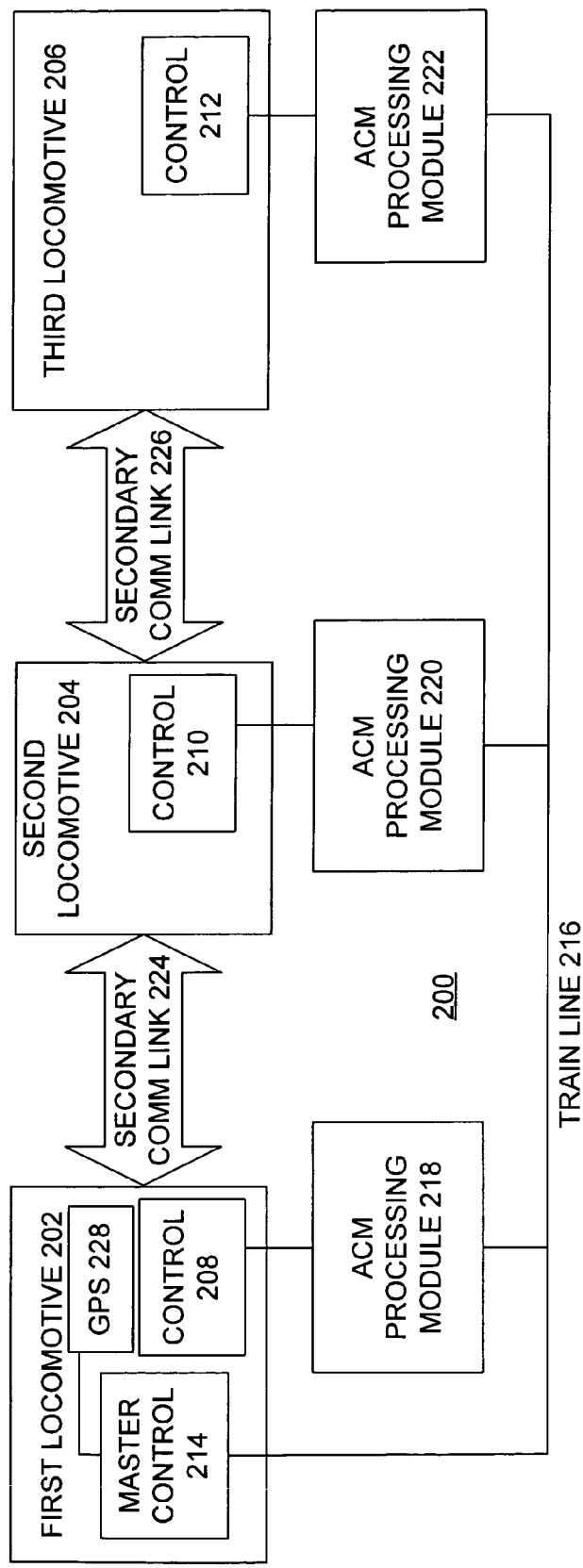
FIG. 2 is a block diagram of an alternative to the FIG. 1 embodiment that may be retrofitted to an existing three-locomotive consist.

Referring to FIG. 2, an alternative embodiment of a system and method according to the invention is illustrated. In this embodiment it is assumed that a consist of three-locomotives 202, 204, and 206 are retrofitted in order to create a system according to the invention which operates according to the method of the invention. According to the present state of the art, each locomotive 202, 204, and 206 of a consist would have its own locomotive control, 208, 210, 212, respectively. A master control 214 would be located on a lead locomotive and would be connected to the locomotive controls via a communication link such as a train line 216. When an operator in the lead locomotive 202 would set the master control 214 at a particular notch position, for example notch 6, this information would be provided via the train line 216 to the controls 208, 210, and 212. As a result, each of the locomotives 202, 204, and 206 would be operated at a notch 6 position. It is noted that the lead locomotive may not be the first locomotive, particularly in a distributed power system. In general, the lead locomotive is the one in which the operator rides.

According to the invention, an automatic consist management (ACM) processing module 218, 220, and 222 is interposed between the master control 214 and each of the locomotive controls 208, 210, and 212. The ACM processing module is preferably a microprocessor-controlled device that intelligently processes the notch command from the master control 214 and provided to each of the locomotives via the train line 216. In one alternative embodiment, the modules would have 27 inputs and 27 outputs to correspond to the wire harness of the train line and would operate according to the standard train line protocol.

In general, multiple unit control is used to designate control systems designed for the operation of two or more locomotives in a train when the locomotives are controlled simultaneously by one operator. The definition has been broadened in use to include auxiliary functions such as alarms and information transmission, such as fuel level on trailing units. The term is frequently abbreviated as MU. The wires passing through the locomotives from end receptacle to end receptacle for control purposes are known as train line wires that interconnect the MU. Each has a number and a letter designation. The numbers correspond to the receptacle pin numbers. The letter designation is more arbitrary, and for some wires may vary depending on the application, as the function of the individual wires has varied over time. Even the number of pins in the receptacle has been changed. The standard number for sometime has been 27, but 21 was common not too long ago. There have been additional train lines as well. Compatibility between various locomotives is extremely important. On passenger locomotives, separate train lines are applied for voice communication, music, car door control and so on. There have also been some non-electrical MU schemes. For example, some MU systems were pneumatic, depending on pressure control for notch control.

Solid state sensing of train line circuits has been successfully applied for many years. As with other train line circuits, the modules 218, 220, 222 must have the appropriate transient voltage rating and sneak circuit avoidance, especially in the case of accidental grounds, which may occur anywhere. The modules must also avoid freewheeling paths, which can occasionally cause problems. Operationally, the threshold between on and off sensing must be set high enough to avoid detecting leakage voltages. Even with a fairly high threshold, leakage of the MU wires of a consist can rise supposedly open and dead wires to surprising levels, in the tens of volts. With relay sensing, the load of the coils keep the voltage low and there may not be enough power available by a large margin to pick up the coil. With high impedance, solid-state circuits, voltages may exceed threshold values. To prevent this external dummy loads may be necessary. In some cases, such train lines have a 1,000-Ohm, 50/25-watt resistor connected to the neutral wire of a load. In each and every situation, the modules 218, 220, and 222 must be compatible with the MU.

For example, in one preferred embodiment, the ACM processing modules may be programmed to optimize fuel efficiency of the consist. This programming may be in the form of an algorithm which determines the best notch combination for the consist to obtain the best fuel efficiency or may be a look up table as noted below. In the three-unit consist example, when the operator sets the master control 214 at notch 6, a command is sent out at notch 6 via the train line 216 to each of the locomotive controls 208, 210, and 212. Assume further, for example, that each of the ACM processing modules 218, 220, and 222 will operate their respective locomotives according to the following Table 1.

command that it receives for the lead unit as a notch 8 command that will be provided to the locomotive control 208 to operate the first locomotive 202 at notch 8. Similarly, the ACM processing module 220 will interpret the notch 6 command received from the master control 214 via the train line 216 as a notch 8 command that will be provided to locomotive control 210. As a result, the second locomotive will also be operating at a notch 8 position. In contrast and independently, the ACM processing module 222 will interpret the notch 6 command as an idle command that will be provided to the locomotive control 212 so that the third locomotive 206 will operate in an idle mode. By running at an N8-N8-idle combination, the locomotive consist has a higher fuel efficiency than one operating at an N6-N6-N6 combination. As shown in line 3 of the above-noted table, the total group horsepower (GHP) output level for an N6-N6-N6 current consist notch would be 8820 at a fuel consumption rate of 421.15 gallons providing a horsepower/gallon/hour rate of 20.94. In contrast, an optimized notch combination of N8-N8-idle provides a total GHP output level of 9000 with a consist fuel consumption rate of 423.15 gallons so that the HP/Gal/Hr rate is 21.27. This provides a two percent increase in fuel efficiency. Alternatively, an N7-N7-N4 may be employed to obtain a similar fuel savings at the same GHP output level. Similar savings can be achieved by developing tables or algorithms for a consist of two, four or more locomotives. For example, the following

TABLE 1

Fuel Saving for Three-Locomotive Consist

| Current Consist Notch Combination | Total GHP Output Level | Consist Fuel Consumption Rate (Gal.) | HP/Gal/Hr | Optimized Notch Combination | Total GHP Output Level | Consist Fuel Consumption Rate (Gal.) | HP/Gal/Hr | Fuel Efficiency Improvements |
|---|---|---|---|---|---|---|---|---|
| N8-N8-N8 | 13500 | 629.48 | 21.45 | N8-N8-N8 | 13500 | 629.48 | 21.45 | 0% |
| N7-N7-N7 | 10980 | 509.17 | 21.56 | N7-N7-N7 | 10980 | 509.17 | 21.56 | 0% |
| N6-N6-N6 | 6820 | 421.15 | 20.94 | N8-N8-Idle | 9000 | 423.15 | 21.27 | 2% |
| N5-N5-N5 | 6660 | 330.00 | 20.14 | N7-N7-Idle | 7320 | 342.95 | 21.34 | 0% |
| N4-N4-N4 | 4650 | 233.33 | 19.93 | N8-Idle-Idle | 4500 | 216.83 | 20.75 | 4% |
| N3-N3-N3 | 3120 | 164.97 | 18.91 | N7-Idle-Idle | 3660 | 176.72 | 20.71 | 10% |
| N2-N2-N2 | 1500 | 81.21 | 18.47 | N2-N2-N2 | 1500 | 81.21 | 18.47 | 0% |
| N1-N1-N1 | 600 | 34.03 | 17.23 | N1-N1-N1 | 600 | 34.83 | N/A | 0% |

As a result of the information provided by the above table, the ACM processing module 218 will map the notch 6

Table 2 illustrates the fuel savings for a two-locomotive consist according to the invention.

TABLE 2

Fuel Saving for Two-Locomotive Consist

| Current Notch Combination | Total GHP Output Level | Consist Fuel Consumption Rate (Gal/Hr) | Fuel Efficiency HP/Gal/Hr | Optimized Notch Combination | Total GHP Output Level | Consist Fuel Consumption Rate (Gal/Hr) | Fuel = Efficiency HP/Gal/Hr | Fuel Efficiency Improvements |
|---|---|---|---|---|---|---|---|---|
| N8-N8 | 9000 | 419.65 | 21.45 | N8-N8 | 9000 | 419.65 | 21.45 | 0% |
| N7-N7 | 7320 | 339.45 | 21.56 | N7-N7 | 7320 | 339.45 | 21.50 | 0% |
| N6-N6 | 5880 | 280.77 | 20.94 | N6-N6 | 5880 | 280.77 | 20.94 | 0% |
| N5-N5 | 4440 | 220.46 | 20.14 | N8-Idle | 4500 | 213.33 | 21.09 | 5% |
| N4-N4 | 3100 | 155.55 | 19.93 | N6-Idle | 2940 | 143.88 | 20.43 | 3% |
| N3-N3 | 2080 | 109.98 | 18.91 | N5-Idle | 2220 | 113.73 | 19.52 | 3% |
| N2-N2 | 1000 | 54.14 | 18.47 | N2-N2 | 1000 | 54.14 | 18.47 | 0% |
| N1-N1 | 400 | 23.22 | 17.23 | N1-N1 | 400 | 23.22 | 17.23 | 0% |

As shown in FIG. 2, it is contemplated that an optional feature of the invention may include a secondary communication link 224 and 226 between the controls. This link may be used to pass other locomotive operational information, such as fuel level, fuel flow rate, tractive effort and locomotive status, between the ACM processing modules and/or between the locomotive controls 208, 210, and 212. The exchanged information may be used by the ACM processing modules to cooperate with miscellaneous locomotive operation situations and maximize benefit of the system 200 according to the invention.

It is noted that the tables above demonstrate various notch combinations that can be used for more fuel-efficient operation of a locomotive consist and further indicate the estimated fuel improvement. The tables above are based on a fuel savings analysis for a GE Dash 9 locomotive and an AC4400 locomotive. The same or similar analysis can be applied to other locomotives such as the GE Dash 8 and the EMD microprocessor controlled locomotives. Additional types of locomotives or a mix of locomotives may also be managed based on locomotive profiles or characteristics for which tables or algorithms are developed that characterize their operating characteristics, power levels and fuel use rates.

Figure 3:
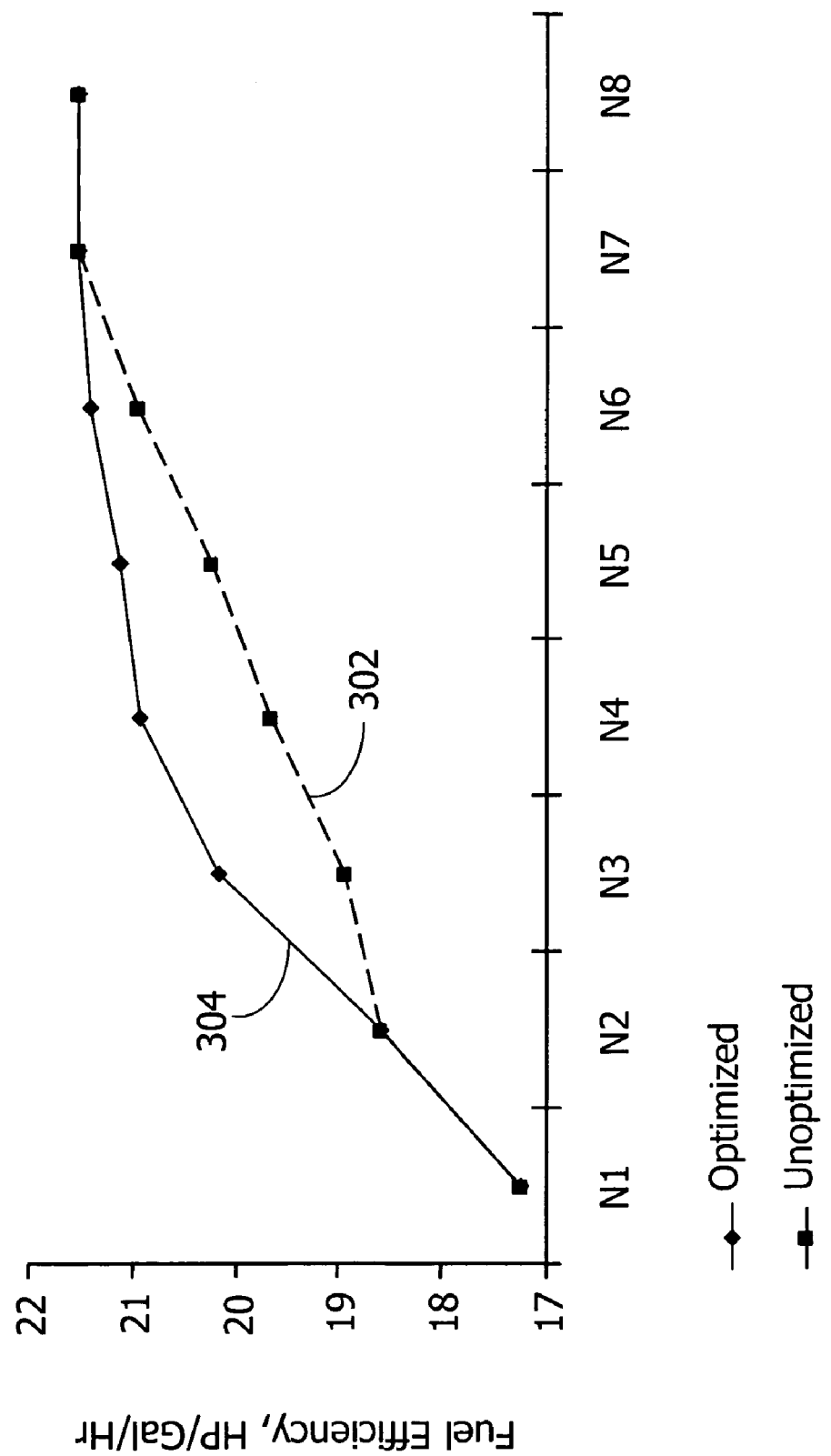
FIG. 3 is a chart indicating the fuel saving opportunity of consist optimizer for a consist comprised of three-locomotives.

From the above it can be seen that several features of the invention are achieved. For example, a total fuel savings of at least 1–2% can be obtained by independently controlling the notch positions of the various locomotives, depending on a consist duty cycle. This is further demonstrated in FIG. 3. FIG. 3 is a graph of fuel efficiency in horsepower per gallons per hour. As is shown, line 302 represents a three-locomotive consist operating in an un-optimized mode for each of throttle notches N1 to N8. By comparison, line 304 represents the same three-locomotive consist operating utilizing a consist optimizer optimized for fuel efficiency. As indicted by line 304, operating in throttle position notch N3, N4, N5 or N6, the consist operates at a higher fuel efficiency, e.g., greater horsepower per gal of fuel used per hour of operation. In this particular embodiment, there is no apparent fuel savings in lower throttle positions N1 and N2 or in the higher throttle positions N7 and N8. In other embodiments, a consist of other types of locomotives, or a different consist configuration the fuels saving may be different and may be more efficient in all of the throttle notch positions.

By way of example, it is noted that in the lower notch positions, fuel savings or independent operation may not be desirable. Accordingly, in certain modes of operation, the system and method of the invention may not vary the notch positions of the various locomotives so that the notch positions may be the same for all locomotives within the consist. From an operator's point of view, no additional operating action steps are required. Since the operator/locomotive interface remains unchanged and the operator is merely controlling the master control 214, the system of the invention and its method of operation are transparent to the operator.

Although the above example has been described with respect to the optimization of fuel efficiency, it is contemplated that any operating parameter of the consist may be optimized or minimized depending on the desirable outcome needed. For example, the notch positions of the locomotives of the consist may be independently controlled to minimize emissions or other less desirable output aspects of the consist.

It is also contemplated that several features regarding the operating parameters of the consist may be taken into account in determining the particular notch positions of the various locomotives of the consist. In other words, more than one operating parameter of the consist may be optimized according to the invention. For example, it may be desirable to reduce noise in the lead unit where the operator and crew are located thereby minimizing noise in the operator cab and increasing crew comfort. This can be accomplished by minimizing utilization of the lead unit or maximizing lead unit idling time or maximizing the use of one of the other locomotives other than the lead unit. In the example noted above where the operator commands a notch position of 6, an implemented notch arrangement of idle-N8-N8 may be accomplished to achieve this aspect of the invention.

Another operating parameter that needs to be considered is the operating time of any one unit of the consist as well as the total operating time of any one unit of the consist. To avoid excessive usage of any one unit of the consist, the utilization of locomotives may be rotated depending on relative fuel level of each unit in the consist. In addition, newer locomotives with less operating time can be favored over older locomotives with more operating time in their history. In addition, if these similar locomotives are part of the consist, locomotives with higher efficiency may be favored over locomotives with lower efficiency.

As an alternative feature of the invention it is contemplated that the system may notify the operator whenever the number of ACM system equipped units in a consist is greater than one, even though some of the units which are present in the consist may not be ACM equipped. It is also contemplated that in certain situations the ACM system may be disabled such as when the train speed is too low, when wheel slip is detected or when certain faults are logged into any units.

Although the above discussion generally relates to optimizing fuel consumption as the desired operating mode which is optimized, the invention contemplates that any parameter of the consist may be optimized or minimized or maximized depending on the situation. For example, in certain situations, power output or performance of the locomotives may be optimized. In addition, many consists include a global positioning system (GPS) link 228 which indicates a position of the consist so that the terrain on which the train is traversing is known. In this situation, it is contemplating that the operating mode may be optimized as a function of the position of the consist as indicated by the GPS system. As a specific example, suppose that a consist of four locomotives is spread throughout a mile long train so that at some point in the trip some of the locomotives are traveling uphill while others are traveling downhill. If acceleration, coasting or braking is required at that point, it may be preferable to vary the power modes of operation of each of the locomotives of the consist to achieve an desired, optimal result.

In one form, the invention includes a method for controlling a consist of at least first and second locomotives having discrete operating modes. The controlling method would include the following steps. First, an operator would indicate a desired operating mode of the consist such as a notch position, e.g., N6. Either manually or automatically, a discrete mode for the first locomotive would be selected as a function of the indicated, desired operating mode. For example, in the case of a two-locomotive consist and referring to Table 2, line 4, a desired operating mode of N5 suggests the first locomotive should operate at N8. Next, a discrete operating mode for the second locomotive would also be selected as a function of the indicated, desired operating mode. In the case of an N5 indication, the second locomotive according to Table 2 would be operated at an idle. As a result, in response to the indicated, desired operating mode, a selected mode of operation of the first locomotive (e.g., N8) is different than the selected mode of operation of the second locomotive (e.g., idle).

Although the invention has been described above as being implemented by a look up table such as illustrated in Tables 1 and 2, it is also contemplated that other information may be taken into account in determining how to implement the invention. For example, as noted above, algorithms may be used to calculate optimum combinations. Alternatively, many locomotives have known profiles of operation or have profiles of operation which can be determined or which can be monitored over time to be determined. Such profiles may be used in establishing a look up table for consist operation or for defining an algorithm. It is also contemplated that the ACM processing module may develop a unique profile for its associated locomotive and that the profile would be used to determine locomotive operation in combination with the profiles of the other locomotives of the consist. Furthermore, the profile may be dynamic in the sense that the ACM processing module may adjust or modify the profile according to the time of year or age of the locomotive or other variables. As an example, assume that a performance profile of the first and second locomotives is known. In this situation, the first and second operating modes for the first and second locomotives may be selected to optimize the performance parameter as a function of the known profiles.

It is also contemplated that the system and method of the invention may be implemented as a retrofitted kit to an existing consist. For example, in a prior art system for controlling in response to an operator, a consist including a first locomotive 202 and a second locomotive 204, the master control 214 constitutes an operator control for use by the operator to indicate a desired operating mode of the consist. The first controller 208 controls an operating mode of the first locomotive 202. The second control 210 controls an operating mode of the second locomotive 204. The train line 216 communicates a desired operating mode of the consist as indicated by the master control 214 to the first and second controllers 208, 210, respectively. The retrofitted system according to the invention includes a first module 218 between the master control 214 and the first control 208. The first module 218 receives the desired operating mode from the master control 214 via the train line 216 and selectively provides a first modified operating mode to the first controller 208 for use in controlling the first locomotive 202. Depending on the table or algorithm used to adjust the notches, the module 218 would either increase, decrease or maintain at the same level the notch indication provided to the first control 208 as compared to the desired notch indication from the master control 214. A second module 220 is interposed between the master control 214 and the second control 210. The second module, as with the first module, receives a desired operating mode via the train line 216 and selectively provides a second modified operating mode to the second controller 210. In at least one mode of operation of the consist, the operating mode of the first and second locomotives is different as compared to the desired operating mode of the consist. For example, if the system is operating according to Table 2, lines 4, 5, and 6, a consist operating mode of N3, N4 or N5 will result in an operating mode of N5-idle, N6-idle or N8-idle for the first and second locomotives, respectively.

A consist optimizer can be deployed in several implementation arrangements within the railway track, train, consist and locomotive management levels. The first arrangement utilizes partial optimization, in that only the lead locomotive is equipped with a consist optimizer. In this embodiment the "lead" locomotive controls the train line independent of its own notch setting. A lead locomotive here is referred to as the lead since it is equipped with the consist optimizer. The lead locomotive receives a control command from an operator or control system. The lead locomotive receives the command and controls a power operating for the lead locomotive consistent of the command. However, the consist optimizer would determine an optimized power operating mode for each of the "trailing" locomotives in the consist, e.g., any locomotive in the consist other than the lead locomotive. The lead locomotive communicates the power operating mode for each trailing locomotive to the respective trailing locomotive. The trailing locomotive controls an operation of the trailing locomotive in response to the provided power operation mode. This one-way communications is least expensive to implement as it requires only the lead locomotive be equipped with the consist optimizer system. This arrangement yields approximately 1% fuel savings.

The next implementation arrangement utilizes two-way communications between each of the trailing locomotives and the lead locomotives or between all locomotives within the consist and the consist optimizer. This allows each of the locomotives to exchange operating, configuration or profile data with the consist optimizer such that the consist optimizer knows the configuration or makeup of the locomotives in the consist. In this arrangement, the consist optimizer uses algorithms or look-up tables to optimize the operation of the consist and each of the locomotives within the consist. For example, optimization may be based on fuel consumption, horsepower per hour, or a balancing between the two. This level of implementation enables an operator or the system to isolate and take off line any locomotive in the consist. The consist optimizer in this configuration may be located on any one of the locomotives in a consist, on an railway vehicle, or may be located at a data center or operations center, remote from the consist. In any of these cases, the communications between the locomotives and/or the consist optimizer may be a wired facility, or a wireless facility. This implementation arrangement provides additional fuel savings when trains are dispatched with high horsepower to trailing ton ratios to enable the consist to provide horsepower sufficient for steep grades which may be only located on a small percentage of the total track traversed by the consist or train. Additionally, enabling the consist optimizer to disable (placed into a null power operating mode) a particular locomotive within a consist enhances operator safety especially where the disabled locomotive is the one where the operator is located.

The third implementation arrangement employs an off-board communications to allow for remote monitoring of the entire system for auditing purposes. As discussed above, the consist optimizer may be located off-board any of the locomotives within the consist such as a remote operations center or data center. Some of all of the components of the consist optimizer may be located on a locomotive or at the remote center in a distributed architecture utilizing communications facilities.

One disadvantage that may arise from running separate locomotives in a consist at different notch levels is that fuel consumption, and therefore megawatt per hour (MWHr) power generation may not be equal across all locomotives. MWHr balancing is considered to be a long-term concern, while consist fuel balancing is often a mission specific objective. The consist optimizer algorithms address fuel balancing differently on each level of implementation. In the first arrangement, fuel is balanced by the selection of throttle notch setting on the lead versus trail locomotives across the locomotives' duty cycle. In some throttle notch settings, the lead is at higher horsepower and in some throttle settings the trail units are at higher horsepower operation. In the second implementation arrangement which is equipped with two-way communications between the locomotives and the consist optimizer, the consist optimizer algorithms use real time fuel measurements from the locomotive fuel gauges to ensure fuel balancing and optimize consumption. The third implementation arrangement allows not only inter-consist fuel balancing but also provides a means for total fuel management/optimization within the railroad's system.

Figure 4:
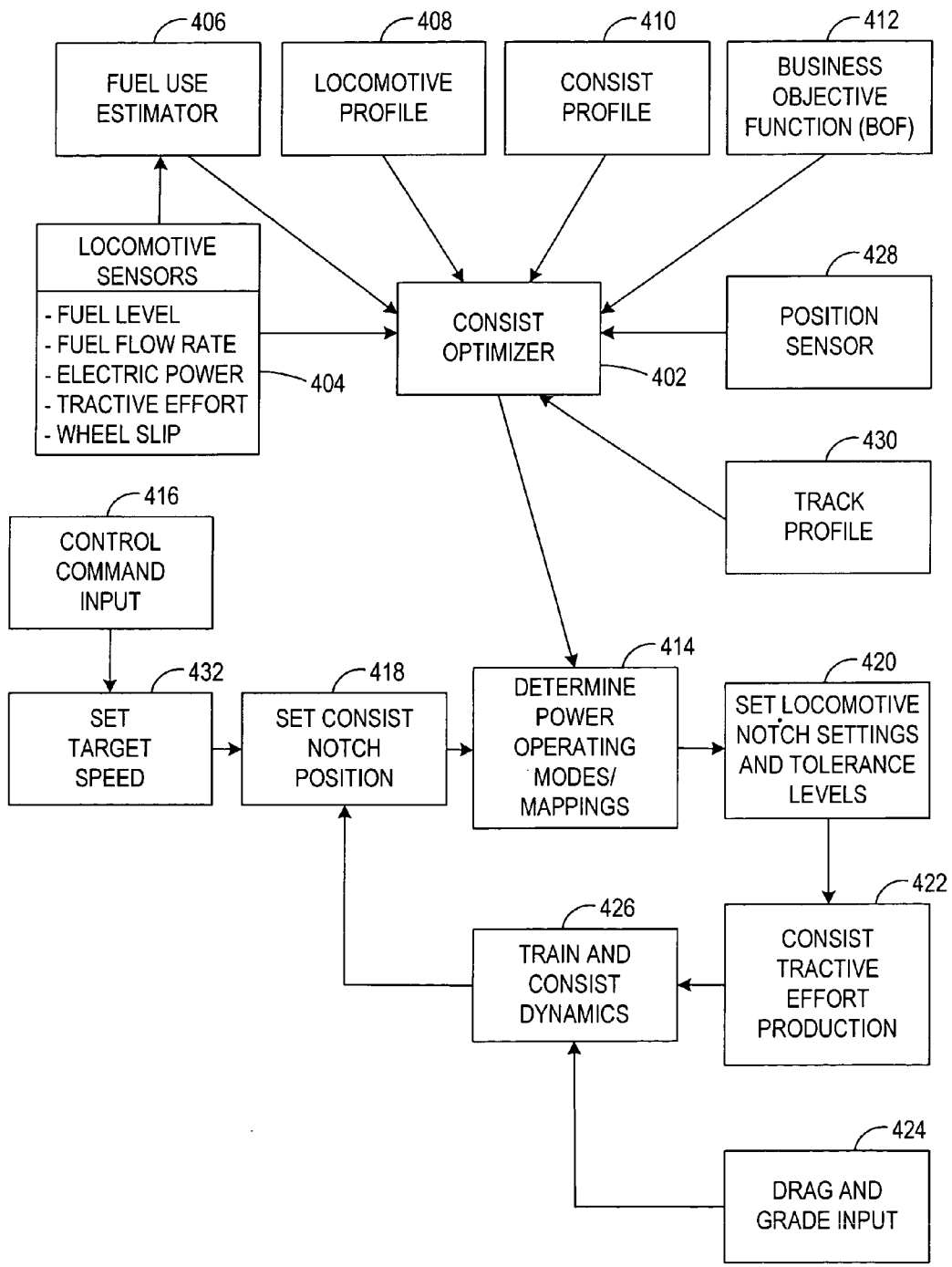
FIG. 4 is a block diagram of one embodiment of a consist optimizer system.

FIG. 4 illustrates one embodiment of a consist optimization system 400. In this embodiment, consist optimizer 402 is comprised of a processor or computer system that is located on board one or more of the locomotives comprising a consist or may be located in a central location such as a data center or operations center. The consist optimizer 402 contains algorithms and/or look-up tables as discussed above. The consist optimizer 402 may operate to manage or control the operations of one or more locomotives in a consist depending on their configuration and capabilities. The consist optimizer 402 may also be configured by hardware or software to manage or optimize the operations of the locomotives within a consist based on any type of optimization parameter, characteristic or business objective function 412. Such external business objective function 402 may be determined by a remote system or by data entry.

In one embodiment, optional locomotive sensors 404 are located on one or more of the locomotives in a consist. Such sensors 404 measure one or more operating characteristics of the locomotive. Operational characteristics that may be sensed and provided to the consist optimizer 402 including fuel level, fuel flow rate, electric power generated by the locomotive, tractive effort and wheel slip. Another optional input into the consist optimizer 402 is fuel use. A fuel use estimator 406 receives one or more of the sensed operating characteristics of the sensors 404 to estimate the fuel use for each locomotive.

Another optional input to the consist optimizer 402 is a locomotive profile 408. A locomotive profile 408 defines one or more operating parameters or characteristics of the locomotive. Such operating parameters may be a function of the type, make, model, age or condition of the locomotive. These may include fuel consumption, horsepower, or other data. Additionally, a locomotive profile 408 may be locomotive specific such that the profile is configured from past or measured operating parameters of the particular locomotive. The locomotive profile 408 may include other data determined to be a factor in determining the optimization of the consist, such as an emissions characteristic.

An additional input to the consist optimizer 402 maybe a consist profile 410. The consist profile 410 may include information related to the number, location etc of the locomotives in the consist. Similarly, train data may be provided to the consist optimizer 402 which would include data associated with the number of railway vehicles comprised in the train associated with the consist, or may include track data or a track profile 430. A track profile may include data related to the track layout, the route, specific characteristics such as track grade, or tunnels, track conditions, etc.

Another optional input, as discussed above, is a position sensor or position determination system such as a GPS system. Such as system could be any system that determines the geographic location of the consist, the train or a locomotive in the consist.

The consist optimizer 402 collects these various available and/or applicable inputs and determines the appropriate optimization requirements and/or power operating modes for each of the locomotives within the consist based on an input control command 416. The control command 416 may be a throttle setting established by a train operator located on one of the locomotives in the consist or may be determined by a control system or operator that is remote from the locomotive or the consist.

The control command may be provided to set a target speed 432 or may establish an input control command to the optimizer. The optimizer sets a consist notch position or horsepower setting. Based on the established notch or horsepower setting and the inputs received, the consist optimizer 402 determines the power operating modes or mapping 414 for each of the locomotives within the consist. The consist optimizer 402 communicates the determined power operating mode for each locomotive in the consist to the corresponding locomotive. Each of the locomotives control the operation of the locomotive according to the power operating mode for each particular locomotive. The consist optimizer 402 may also determine any tolerance levels to be provided to the locomotive to enable to the locomotive to operate in an efficient manner. Each locomotive produces its associated tractive effort to compose the total consist tractive effort production 422. The tractive effort production 422 is monitored and a train and consist dynamics module 426 provides a feedback input into the input of the consist notch position determination. Additionally, train or consist drag and/or track grade 424 may be input into the train and consist dynamics 426 determinations.

A typical requirement of any fuel optimization system is crew operation training. However, the consist optimizer system and method minimizes the effort of training crews to use the system. Actual control of the consist horsepower output is accomplished by the system with no on-line operator input being required.

In operation, the consist optimizer system may be utilized to manage the operation of one or more locomotives comprising a consist. In one embodiment, the method for controlling a consist of at least first and second locomotives having discrete operating modes includes receiving a control command. Of course it should be understood that this method may be applied to managing a consist comprised of any number of locomotives. As discussed above, the control command may be a command entered by an operator which is located on one of the locomotives or the train, may be an operator located at a remote location, or may be a remote control system. The consist optimizer determines a power operating mode of the first locomotive and a power operating mode of the second locomotive as a function of the control command and an optimization parameter. The optimization parameter may the horsepower output, fuel efficiency, emissions output, the identification of a locomotive in which a crew member is located or a locomotive in which a crew member is not riding, and/or braking capacity. Of course any optimization parameter may be utilized as discussed above.

The power operating mode of the second locomotive is different as compared to the power operating mode of the first locomotive in at least one mode of operation of the method. The method further comprises controlling the first locomotive responsive to the power operating mode of the first locomotive and controlling the second locomotive responsive to the power operating mode of second locomotive.

In the embodiment where one or more of the locomotives are equipped with a GPS receiver or the rail system has a method of determining the geographic position of the consist, train or any locomotive in the consist or train, the power operating mode of the first locomotive and the power operating mode of the second locomotive may also be determined as a function of the determined geographic position of the consist or one or more of the locomotives within the consist. Or in another related embodiment, the power operating mode of the first locomotive may be determined as a function of the determined geographic position of the first locomotive and the power operating mode of the second locomotive may be determined as a function of the geographic position of the second locomotive. This case may be applicable where the train is especially long and the locomotives in the consist are separated such as at the beginning and the end of the train. In such an arrangement or embodiment, the locomotive at the front of the train may be traversing a section of the track having an incline while at the same time the locomotive at the rear of the train may be traversing a section of track having a decline. As such, the consist optimizer may utilize the track network profile or configuration that may include track grade or other feature in conjunction with the geographic position data to establish the power operating mode for one of more of the locomotives.

In another embodiment, the optimization parameter is a performance parameter, wherein a performance profile of the first and second locomotives is known and wherein the first and second operating modes are selected to optimize the performance parameter as a function of the performance profile. Such a performance profile is discussed in greater detail above.

The method of managing a consist and the locomotive within the consist includes communicating and/or storing a locomotive profile associated one or more of the locomotives in the consist. In such an embodiment, the power operating mode of each locomotive may be determined as a function of the first locomotive profile and/or the second locomotive profile. Such locomotive profiles may include a type of locomotive, an age of the locomotive, a locomotive power rating or output, a fuel efficiency of the locomotive, an emission characteristic or parameter, or another operating characteristic.

In another embodiment of the invention, one or more locomotives may be equipped with a communication facility configured to provide one or more operating characteristics to the consist optimizer. Such characteristics would be real-time or near real-time measurements of characteristics of the locomotive in operation. In such as case each so equipped locomotive would communicate one or more operating characteristics from the first locomotive to the consist optimizer or to another locomotive. The power operating mode of each of the locomotives may then be determined as a function of the received operating characteristics. Such operating characteristics may include any operating characteristic including fuel level, fuel flow rate, electric power generated by the locomotive, tractive effort and wheel slip. In another aspect of the invention, a method for controlling a consist of at least first and second locomotives having discrete operating modes.

Another embodiment of the method of the invention comprises receiving a control command from an operator and controlling an operation of the first locomotive responsive to the power operating mode of the first locomotive, said power operating mode of the first locomotive being indicative of the control command. The method also comprises determining a power operating mode of the second locomotive as a function of the control command. The power operating mode of the second locomotive is different as compared to the power operating mode of the first locomotive in at least one mode of operation of the method. The method further comprises communicating the power operating mode of the second locomotive over a communication link to the second locomotive and controlling an operation of the second locomotive responsive to the power operating mode of the second locomotive.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for controlling a consist of at least first and second locomotives each having discrete operating modes, said first and second locomotives being configured for receiving control signals via a communication link, said system comprising:

a locomotive control for indicating a desired operating mode;

a controller electrically coupled to the first locomotive and responsive to the desired operating mode as indicated by the locomotive control for determining a mode of operation of the first locomotive according to a first power operating mode and for determining a mode of operation of the second locomotive according to a second power operating mode, wherein, in at least one mode of operation of the system, the first power operating mode is different as compared to the second power operating mode;

wherein said controller is coupled to the communication link for providing information corresponding to the first power operating mode to the first locomotive and for providing information corresponding to the second operating mode to the second locomotive; and wherein the controller determines that the power operating modes of the first and second locomotives are selected as a function of a sensed fuel consumption rate of at least one of the first and second locomotives.

2. The system of claim 1 wherein a first fuel sensor senses a fuel level of the first locomotive and a second fuel sensor senses a fuel level of the second locomotive, and wherein the controller is in electrical communication with the first and second fuel sensors via the communication link to determine the fuel consumption rate of at least one of the first and second locomotives.

3. The system of claim 1 wherein the first locomotive is a lead locomotive operating at the first power operating mode, and wherein the second locomotive is a trail locomotive operating at the second power operating mode.

4. The system of claim 1 wherein the consist includes a plurality of trail locomotives each operating at the same second power operating mode.

5. The system of claim 1 wherein a plurality of sensors each sense an operating parameter of each locomotive in the consist and generate an output signal representative of the sensed operating parameter, said sensed operating parameters including a fuel level, a fuel flow rate, a power usage amount, a traction effort amount, and a wheel slip amount, and wherein the controller is in electrical communication with each of the plurality of sensors via the communication link to estimate the fuel consumption rate of at least one of the first and second locomotives.

6. The system of claim 1 wherein a first fuel sensor senses a fuel level of the first locomotive and a second fuel sensor senses a fuel level of the second locomotive, and wherein the controller is in electrical communication with the first and second fuel sensors via the communication link to determine the fuel consumption rate of at least one of the first and second locomotives, and wherein the controller modifies the power operating mode of first and/or second locomotives in response to changes in the fuel consumption rate of at least one of the first and second locomotives.

7. The system of claim 1 wherein the power operating mode of the first and second locomotives is selected as a function of the fuel consumption rate and a power consumption rate of at least one of the first and second locomotives.

8. The system of claim 1 wherein a first power sensor senses electrical power usage of the first locomotive and a second power sensor senses electrical power usage of the second locomotive, and wherein the controller is in electrical communication with the first and second power sensors via the communication link to determine the power consumption rate of at least one of the first and second locomotives.

9. The system of claim 8 wherein the power consumption rate is determined by sensing the electrical power usage in horsepower per hour for each of the first and second locomotives over a period of time.

10. The system of claim 8 wherein power consumption rate is determined by sensing electrical power usage in kilowatt-hours for each of the first and second locomotives over a period of time.

11. The system of claim 1 wherein the desired operating mode is received from the first locomotive.

12. The system of claim 1 wherein the desired operating mode is received via wireless communication from remote location.

13. The system of claim 1 wherein the communication link providing control signals to the first and second locomotives is comprised of a wireless communication facility.

14. The system of claim 1 wherein the communication link providing control signals to the first and second locomotives is comprised of a wired communication facility.

15. A system for controlling a consist of at least first and second locomotives each having discrete operating modes, said first and second locomotives being configured for receiving control signals via a communication link, said system comprising:
a locomotive control for indicating a desired operating mode;
a controller electrically coupled to the first locomotive and responsive to the desired operating mode as indicated by the locomotive control for determining a mode of operation of the first locomotive according to a first power operating mode and for determining a mode of operation of the second locomotive according to a second power operating mode, wherein, in at least one mode of operation of the system, the first power operating mode is different as compared to the second power operating mode;
wherein said controller is coupled to the communication link for providing information corresponding to the first power operating mode to the first locomotive and for providing information corresponding to the second operating mode to the second locomotive; and
wherein the controller determines that the power operating modes of the first and second locomotives are selected as a function of a sensed power consumption rate of at least one of the first and second locomotives.

16. The system of claim 15 wherein a first power sensor senses electrical power usage of the first locomotive and a second power sensor senses electrical power usage of the second locomotive, and wherein the controller is in electrical communication with the first and second power sensors via the communication link to determine the power consumption rate of at least one of the first and second locomotives, and wherein the controller modifies the power operating mode of first and/or second locomotives in response to changes in the power consumption rate of at least one of the first and second locomotives.

17. The system of claim 16 wherein the first and second sensors sense the electrical power usage in horsepower per hour for each of the first and second locomotives over a period of time.

18. The system of claim 16 wherein the first and second sensors sense electrical power usage in kilowatt-hours for each of the first and second locomotives over a period of time.

19. The system of claim 15 wherein the first locomotive is a lead locomotive operating at the first power operating mode, and wherein the second locomotive is a trail locomotive operating at the second power operating mode.

20. The system of claim 19 wherein the consist includes a plurality of trail locomotives each operating at the same second power operating mode.

21. The system of claim 15 wherein the power operating modes of the first and second locomotives are selected as a function of the power consumption rate and a fuel consumption rate of at least one of the first and second locomotives.

22. The system of claim 15 wherein the desired operating mode is received from the first locomotive.

23. The system of claim 15 wherein the desired operating mode is received via wireless communication from remote location.

24. The system of claim 15 wherein the communication link providing control signals to the first and second locomotives is comprised of a wireless communication facility.

25. The system of claim 15 wherein the communication link providing control signals to the first and second locomotives is comprised of a wired communication facility.

26. A system for controlling a consist of at least first and second locomotives each having discrete operating modes, said first and second locomotives being configured for receiving control signals via a communication link, said system comprising:
a locomotive control for indicating a desired operating mode;
a controller electrically coupled to the first locomotive and responsive to the desired operating mode as indicated by the locomotive control for determining a mode of operation of the first locomotive according to a first power operating mode and for determining a mode of operation of the second locomotive according to a second power operating mode, wherein, in at least one mode of operation of the system, the first power operating mode is different as compared to the second power operating mode;

wherein said controller is coupled to the communication link for providing information corresponding to the first power operating mode to the first locomotive and for providing information corresponding to the second operating mode to the second locomotive; and wherein the controller determines that the power operating modes of the first and second locomotives are selected as a function of a known performance profile of each of the first and second locomotives in the consist, said performance profile defining one or more of the following for each of the first and second locomotives over a previous period of time:

a fuel level characteristic;

a fuel flow rate; or a power usage rate.

27. The system of claim 26 wherein the performance profile indicates a fuel consumption rate and a power consumption rate for each of the first and second locomotives aver the period of time, and wherein the controller selects the power operating mode of the first and second locomotives as a function of the fuel consumption rate and the power consumption rate for each of the first and second locomotives to optimize the operation of the consist and each of the locomotives within the consist.

28. The system of claim 26 wherein the desired operating mode is received from first locomotive.

29. The system of claim 26 wherein the desired operating mode is received via wireless communication from a remote location.

30. The system of claim 26 wherein the communication link providing control signals to the first and second locomotives is comprised of a wireless communication facility.

31. The system of claim 26 wherein the communication link providing control signals to the first and second locomotives is comprised of a wired communication facility.

* * * * *